(12) United States Patent
Pashnik et al.

(10) Patent No.: US 8,813,609 B1
(45) Date of Patent: Aug. 26, 2014

(54) SYSTEM FOR DE-AERATING FLUID IN A TRANSMISSION

(71) Applicant: GM Global Technology Operations LLC, Detroit, MI (US)

(72) Inventors: Richard A. Pashnik, Saline, MI (US); Gregory Chessky, Walled Lake, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/784,171

(22) Filed: Mar. 4, 2013

(51) Int. Cl.
- *F16H 57/04* (2010.01)
- *F16H 57/03* (2012.01)
- *B01D 19/02* (2006.01)

(52) U.S. Cl.
CPC ............. *B01D 19/02* (2013.01); *F16H 57/03* (2013.01)
USPC ........................................... 74/606 A

(58) Field of Classification Search
USPC ......... 74/606 A, 606 R; 184/13.1, 6.22, 6.23, 184/11.1
See application file for complete search history.

(56) References Cited

U.S. PATENT DOCUMENTS

| | | | | |
|---|---|---|---|---|
| 5,638,774 | A * | 6/1997 | Albertson et al. | 123/41.33 |
| 5,678,461 | A * | 10/1997 | Stine | 74/606 A |
| 6,155,135 | A * | 12/2000 | Gage et al. | 74/606 A |
| 6,997,238 | B1 * | 2/2006 | Ruthy et al. | 165/41 |
| 7,766,126 | B2 * | 8/2010 | Berger et al. | 184/6.12 |
| 8,109,174 | B2 * | 2/2012 | Hilker et al. | 74/606 A |
| 2003/0006085 | A1 * | 1/2003 | Caldwell et al. | 180/339 |

* cited by examiner

*Primary Examiner* — Vicky Johnson

(57) ABSTRACT

A system for de-aerating fluid in a motor vehicle transmission includes a first rib in a first compartment of the transmission, a second rib spaced apart from the first rib, and a third rib spaced apart from the second rib. The first rib and the second rib define a first channel with an inlet region, and the second rib and the third rib define a second channel with an outlet hole. The second rib is positioned between the first rib and the second rib and has a vertical height that is less than the vertical heights of the first rib and the third rib. As the temperature of the fluid rises, the fluid flows into the inlet region, rises up the first channel, flows over the second rib into the second channel, and out of the second channel through the outlet hole.

16 Claims, 4 Drawing Sheets

SYSTEM FOR DE-AERATING FLUID IN A TRANSMISSION

FIELD

The present disclosure relates to motor vehicle transmissions. More specifically, the present disclosure relates to a transmission system for de-aerating hydraulic fluid in the transmission.

BACKGROUND

The statements in this section merely provide background information related to the present disclosure and may or may not constitute prior art.

A typical motor vehicle transmission employs a viscous fluid to lubricate the moving parts in the transmission, as well as, in some transmissions, to provide hydraulic pressure required to operate the transmission. The fluid is typically distributed throughout the transmission through a network of fluid passages while the engine is running. As the temperature of the fluid increases, the fluid expands, and at high enough temperatures, the lubricant may foam or aerate. This foam enters into the gears and causes spin loss which reduces the performance of the transmission, especially from the standpoint of efficiency. Accordingly, there is a need for a system to de-aerate the fluid in motor vehicle transmission.

SUMMARY

A system for de-aerating fluid in a motor vehicle transmission includes a first rib in a first compartment of the transmission, a second rib spaced apart from the first rib, and a third rib spaced apart from the second rib. The first rib and the second rib define a first channel with an inlet region, and the second rib and the third rib define a second channel with an outlet hole. The second rib is positioned between the first rib and the second rib and has a vertical height that is less than the vertical heights of the first rib and the third rib. As the temperature of the fluid rises, the fluid flows into the inlet region, rises up the first channel, flows over the second rib into the second channel, and out of the second channel through the outlet hole.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

Figure 1:
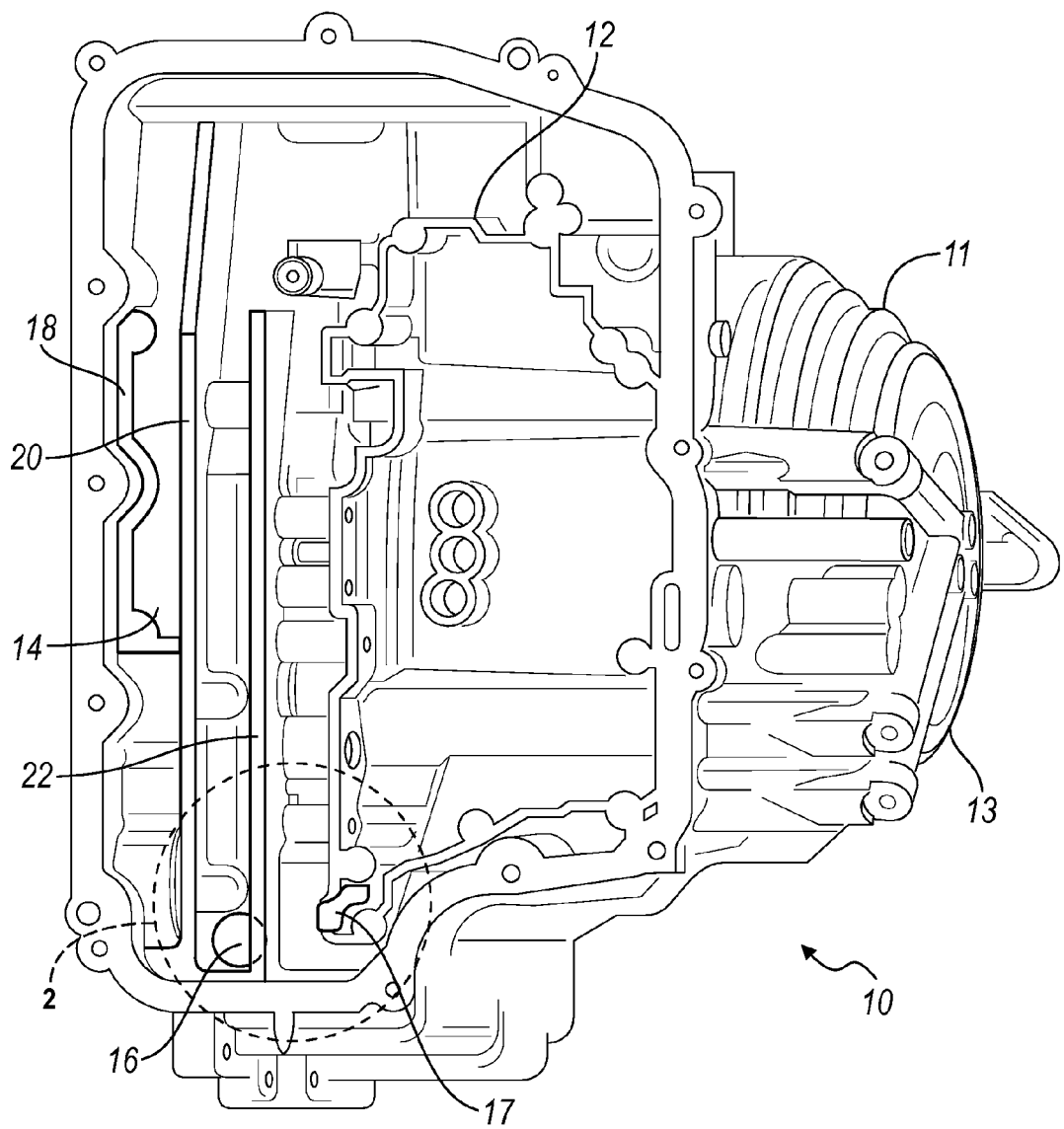
FIG. 1 shows a partial view of a transmission case in accordance with the principles of the present invention.
Figure 2:
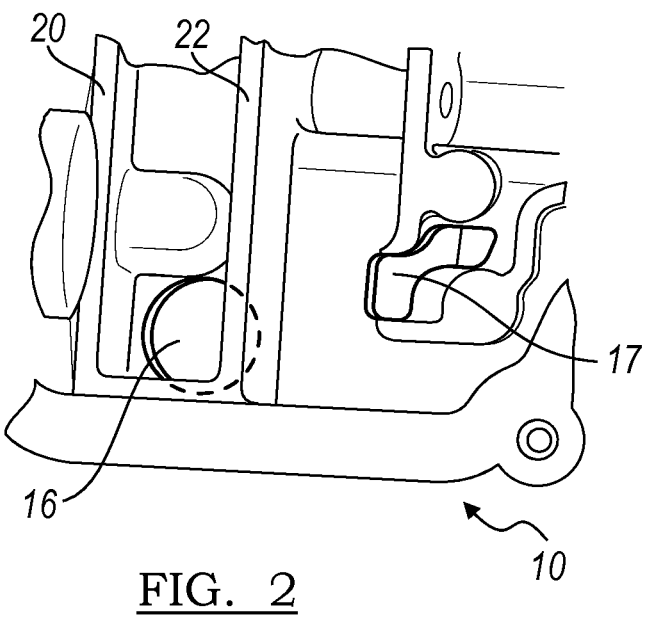
FIG. 2 shows a close-up view of the region 2 shown in FIG. 1.

The following description is merely exemplary in nature and is not intended to limit the present disclosure, application, or uses.

Referring now to the drawings, a motor vehicle transmission case embodying the principles of the present invention is illustrated in FIGS. 1, 2, 4, and 5 and designated at 10. The transmission case 10 includes a component or compartment 13, referred to hereinafter as the gearbox compartment 13, that houses a plurality of gears and a plurality of torque transmitting mechanisms, such as brakes and clutches that selectively engage the gears and another separate component or compartment 12, referred to hereinafter as the control compartment, that houses the transmission control components. A viscous fluid, such as oil, is utilized in the transmission case 10 for cooling and lubrication of the moving components, such as the gears, bearings, and torque transmitting mechanisms. Additionally, in automatic transmissions such a working fluid is also commonly employed for actuating the torque transmitting mechanisms that affect gear ratio changes. The fluid is generally supplied to the transmission via a fluid pump driven by a vehicle's engine or any other suitable pump. The fluid is typically distributed throughout the transmission through a network of fluid passages while the engine is running. After the engine has been shut down and has remained off for an extended period of time, the fluid generally tends to drain down from the passages into a transmission sump under the force of gravity.

The control compartment 12 includes a first rib 18, a second rib 20, and a third rib 22. Note that the vertical height of the second rib 20 is less than the vertical heights of the first rib 18 and the third rib 22. The compartment 12 further includes an inlet area 14 as well as an outlet hole 16 that provides fluid communication between the control compartment 12 and the gearbox compartment 13 that contains the gears and torque transmitting devices.

The transmission case 10 also includes a control valve 17 that when open provides fluid communication between the control compartment 12 and the gearbox compartment 13. As the temperature of the hydraulic fluid or lubricant rises, however, a sensor sends a signal to the control valve 17 to close to prevent fluid from flowing between the compartments 12 and 13 through the control valve 17. A thermal element can be employed in place of the control valve 17 that opens and closes in response to the temperature of the fluid.

Figure 3:
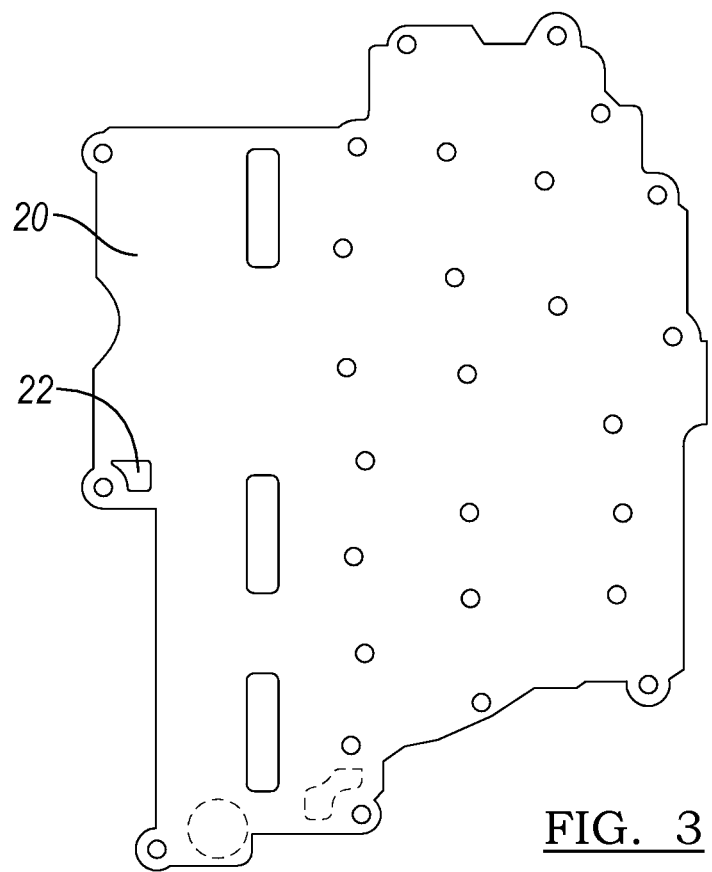
FIG. 3 shows a space plate for the transmission case in accordance with the principles of the present invention.
Figure 4:
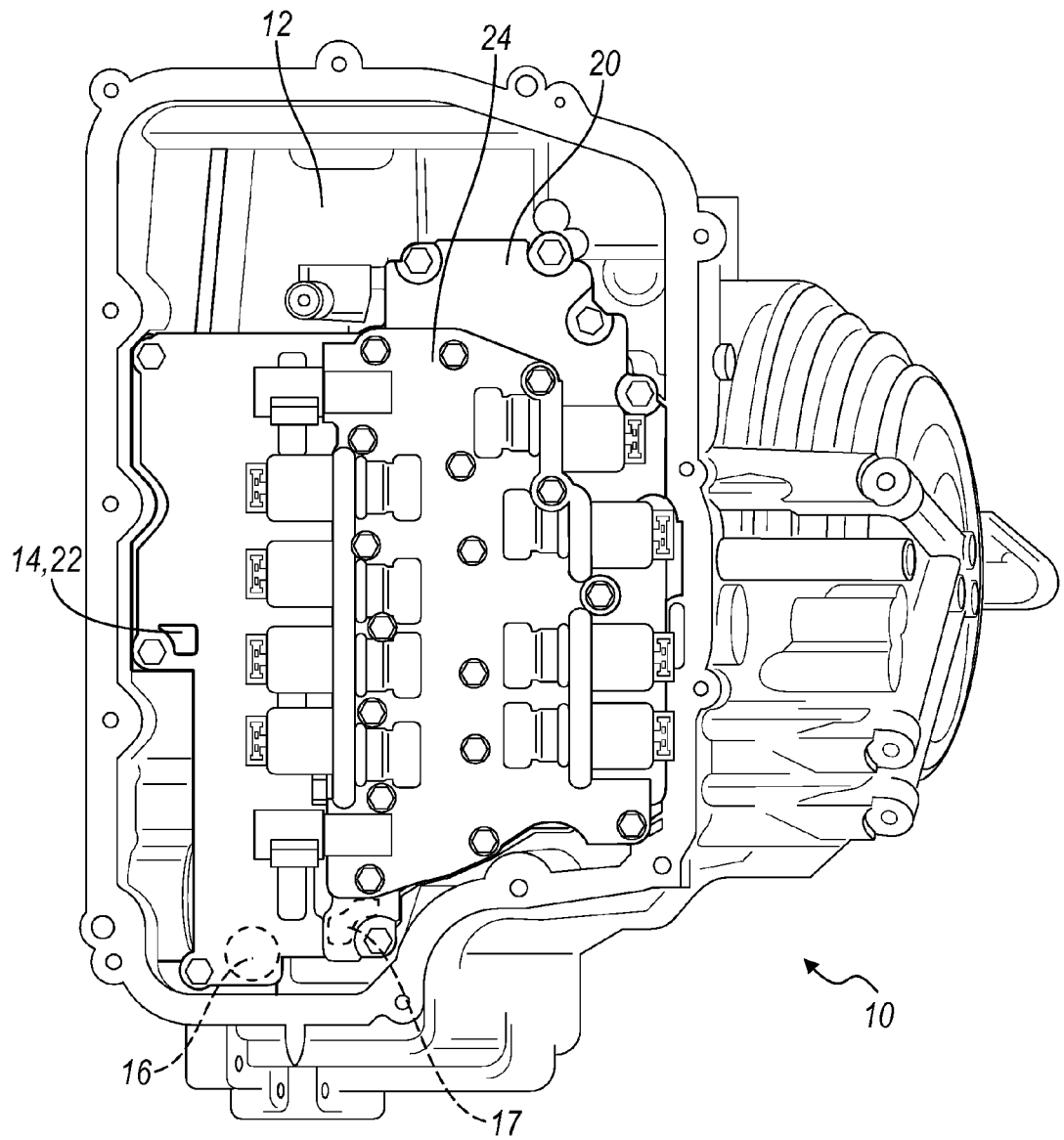
FIG. 4 shows a partial assembled view of the transmission case in accordance with the principles of the present invention.
Figure 5:
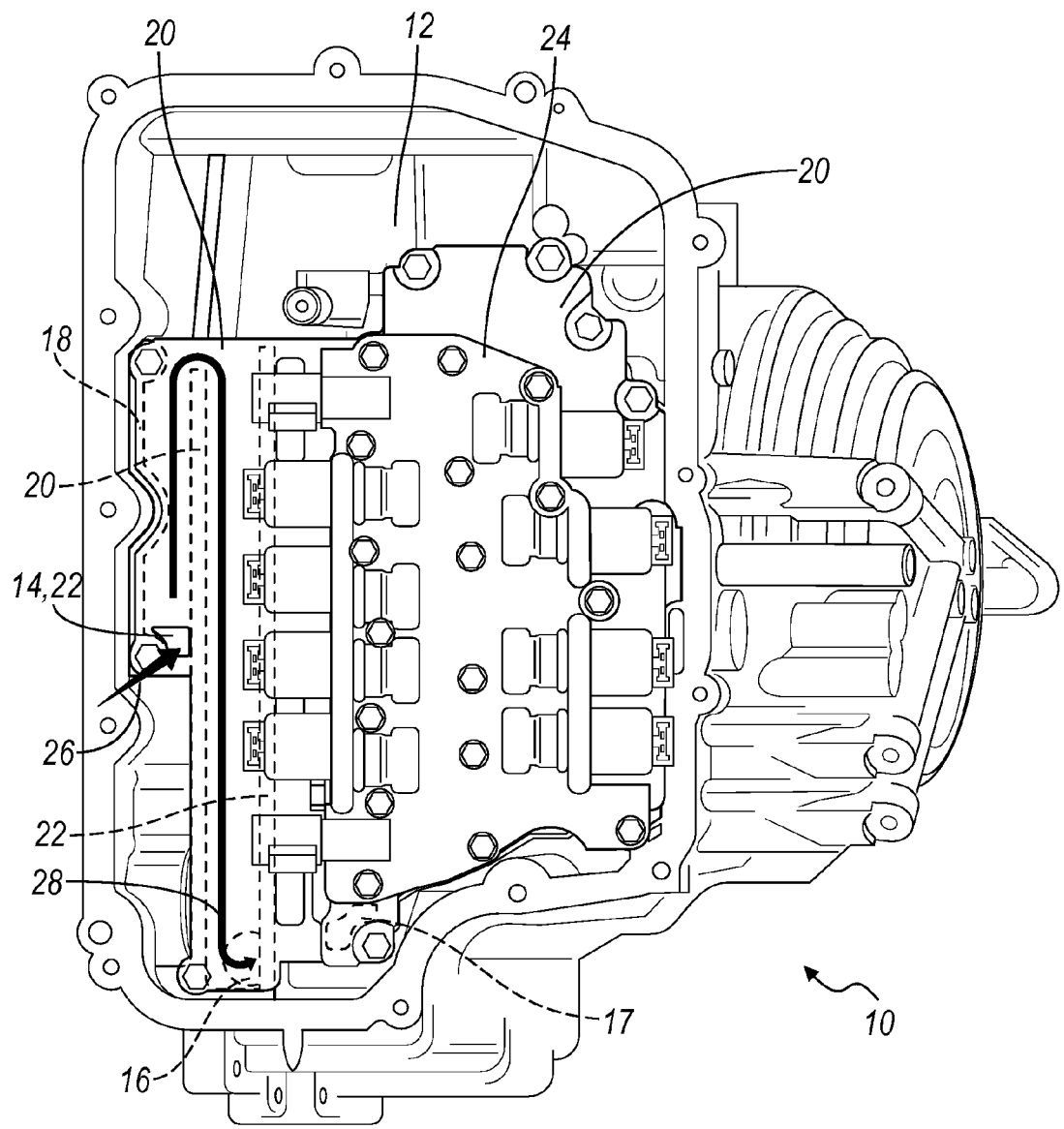
FIG. 5 shows movement of hydraulic fluid in the transmission case in accordance with the principles of the present invention.

Referring also to FIG. 3, a spacer plate 20 is positioned in the compartment 12 and over the first rib 18, the second rib 20, and the third rib 22 thereby forming two channels separated by the second rib 20. The spacer plate 20 also includes an inlet hole 22. Accordingly, if a fluid enters the inlet region 14 through the inlet hole 22, the fluid rises in the channel defined by the first rib 18 and the second rib 20. As more fluid enters into the inlet region 14, the fluid eventually flows over the second rib 20, since its height is less than the height of the first rib 18, into the channel defined by the second rib 20 and the third rib 22. The fluid then flows down the channel defined by the second rib 20 and the third rib 22 to the outlet hole 16. Since the outlet hole 16 remains open, the fluid flowing into the channel defined by the second rib 20 and the third rib 22 flows from the control compartment 12 into the gearbox compartment 13 containing the gears and torque transmitting mechanisms. Note, as shown in FIGS. 4 and 5, the control components 24 are placed on top of the spacer plate 20.

In operation, when the fluid temperature is below a defined low temperature, such as, for example, about 20° C., the control valve 17 or thermal element remains open. At or below this temperature, the fluid remains below the rotating parts in the gearbox compartment 13, and the fluid freely communicates between the control compartment 12 and the gearbox compartment 13.

As the fluid temperature rises above the defined low temperature, a thermo sensor provides a signal to the control valve 17 to close, or if a thermal element is employed, it closes in response to the increasing temperature. Hence, fluid communication between the control compartment 12 and the gearbox compartment 13 through the control valve 17 stops. When this occurs, the temperature of the fluid in the control compartment 12 rises higher than the temperature of the fluid in the gearbox compartment 13. As the temperature of the fluid in the control compartment 12 increase further, it becomes aerated and expands. The level of the aerated fluid ultimately rises to the level of the inlet hole 22. As such, the fluid flows through the inlet hole 22 into the inlet region 14 as indicated by the arrow 26. The aerated fluid rises in the channel defined by the first rib 18 and the second rib 20. As more fluid enters into the inlet region 14, the fluid eventually flows over the second rib 20 into the channel defined by the second rib 20 and the third rib 22 as indicated by the curved arrow 28. As this occurs, the aerated or foamy fluid rises to the top of the two channels defined by the three ribs 18, 20, and 22 while liquid non-aerated fluid flows over the second rib 20 into the channel defined by the second rib 20 and the third rib 22 to the outlet hole 16. As such, liquid fluid flows through the outlet hole 16 from the control compartment 12 into the gearbox compartment 13 containing the gears and torque transmitting mechanisms. Hence, the inlet region 14, the inlet hole 22, the outlet hole 16, control valve 17 (or thermal element), and the two channels defined by the first rib 18, the second rib 20, and the third rib 22 when the spacer plate 20 is placed on top of the ribs 18, 20, and 22 operate as a de-aerating system of the fluid contained in the transmission case 10.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for de-aerating fluid in a motor vehicle transmission comprising:
   a first rib in a first compartment of the transmission;
   a second rib in the first compartment and spaced apart from the first rib, the first rib and the second rib defining a first channel with an inlet region, the inlet region being positioned between the first rib and the second rib and being located near the bottom of the first channel; and
   a third rib in the first compartment and spaced apart from the second rib, the second rib and the third rib defining a second channel with an outlet hole, the outlet hole being positioned between the second rib and the third rib and being located near the bottom of the second channel which is substantially below the inlet region's location, the second rib being positioned between the first rib and the third rib and having a vertical height that is less than the vertical heights of the first rib and the third rib,
   wherein as the temperature of the fluid rises, the fluid flows into the inlet region, rises up the first channel, flows over the second rib into the second channel, and out of the second channel through the outlet hole.

2. The system of claim 1 wherein the outlet hole provides fluid communication between the first compartment and a second compartment of the transmission.

3. The system of claim 2 furthering comprising a control valve that provides fluid communication between the first compartment and the second compartment.

4. The system of claim 3 wherein the control valve receives a signal from a sensor to close off the flow of fluid between the first compartment and the second compartment when the fluid temperature reaches a defined low temperature.

5. The system of claim 4 wherein the defined low temperature is about 20° C.

6. The system of claim 2 wherein the first compartment is a control compartment and the second compartment is a gearbox compartment.

7. The system of claim 1 wherein the fluid becomes aerated at an elevated temperature and becomes de-aerated as the fluid flows from the inlet region through the first and second channels.

8. The system of claim 1 further comprising a spacer plate positioned on the first, second, and third ribs.

9. The system of claim 8 wherein the spacer plate has an inlet hole that coincides with the inlet region.

10. The system of claim 8 wherein the inlet hole is at a higher vertical location than the outlet hole.

11. A motor vehicle transmission comprising:
    a case with a first compartment and a second compartment;
    the first compartment including:
    a first rib;
    a second rib spaced apart from the first rib, the first rib and the second rib defining a first channel with an inlet region, the inlet region being positioned between the first rib and the second rib and being located near the bottom of the first channel; and
    a third rib spaced apart from the second rib, the second rib and the third rib defining a second channel with an outlet hole that provides fluid communication between the first compartment and the second compartment, the outlet hole being positioned between the second rib and the third rib and being located near the bottom of the second channel which is substantially below the inlet region's location, the second rib being positioned between the first rib and the third rib and having a vertical height that is less than the vertical heights of the first rib and the third rib,
    wherein as the temperature of the fluid rises, the fluid flows into the inlet region, rises up the first channel, flows over the second rib into the second channel, and out of the second channel through the outlet hole.

12. The transmission of claim 11 furthering comprising a control valve that provides fluid communication between the first compartment and the second compartment, wherein the control valve receives a signal from a sensor to close off the flow of fluid between the first compartment and the second compartment when the fluid temperature reaches a defined low temperature.

13. The transmission of claim 11 wherein the first compartment is a control compartment and the second compartment is a gearbox compartment.

14. The transmission of claim 11 wherein the fluid becomes aerated at an elevated temperature and becomes de-aerated as the fluid flows from the inlet region through the first and second channels.

15. The transmission of claim 11 further comprising a spacer plate positioned on the first, second, and third ribs, wherein the spacer plate has an inlet hole that coincides with the inlet region.

16. The transmission of claim 15 wherein the inlet hole is at a higher vertical location than the outlet hole.

\* \* \* \* \*